United States Patent [19]

Metcalf et al.

[11] Patent Number: 4,869,106
[45] Date of Patent: Sep. 26, 1989

[54] GOVERNOR CHECKOUT APPARATUS AND METHOD

[75] Inventors: Jeffrey D. Metcalf, Albion; John C. Layer, Caledonia, both of Ill.

[73] Assignee: Sundstrand Corporation, Rockford, Ill.

[21] Appl. No.: 239,985

[22] Filed: Sep. 2, 1988

[51] Int. Cl.[4] .............................................. G01P 3/00
[52] U.S. Cl. ..................................... 73/509; 244/17.13
[58] Field of Search ................. 73/488, 493, 507, 508, 73/509; 244/17.13

[56] References Cited

U.S. PATENT DOCUMENTS

| | | | |
|---|---|---|---|
| 2,160,553 | 5/1939 | Martinotti | 73/509 |
| 3,176,672 | 4/1965 | Rowe et al. | 73/509 X |
| 3,370,600 | 2/1968 | Peterson . | |
| 3,831,615 | 8/1974 | Hartzell . | |
| 3,945,199 | 3/1976 | Bradley et al. . | |
| 3,955,424 | 5/1976 | Williams | 73/535 |
| 4,123,942 | 11/1978 | Rumyantsev | 73/535 |
| 4,164,235 | 8/1979 | Benson . | |

Primary Examiner—Jerry W. Myracle
Attorney, Agent, or Firm—Antonelli, Terry & Wands

[57] ABSTRACT

An overspeed governor for adjusting the blade pitch of a propulsor in an unducted fan aircraft engine to prevent propulsor overspeed comprises a flyweight governor which is rotated in response to rotation of the propulsor, a governor pilot valve with a valve spool which is axially moved in response to actuation of the flyweight governor for adjusting the blade pitch of the propulsor, and a governor checkout apparatus which sensitizes the flyweight governor so that it is actuated to maintain a substantially lower propulsor rotative speed during a start-up operation of the engine as compared with during normal operation, whereby the operation of the governor can be checked out during start-up operation of the aircraft engine.

12 Claims, 2 Drawing Sheets

GOVERNOR CHECKOUT APPARATUS AND METHOD

TECHNICAL FIELD

The present invention is directed to a governor checkout apparatus and a method of checking out the operation of a governor for maintaining the rotative speed of a device rotatably driven by a prime mover. In particular, the invention relates to an overspeed governor for adjusting the blade pitch of a propulsor of an aircraft engine to prevent propulsor overspeed.

BACKGROUND ART

In unducted fan propulsor engines for aircraft, the pitch of the propulsor blades is adjustable to prevent propulsor overspeed. With such systems, an overspeed governor is required to prevent propulsor overspeed in the event of normal electronic control failure. If the overspeed governor is not operating properly, in the event of failure of the normal electronic control the engine could be damaged as a result of an overspeed condition. Accordingly, there is a need for a governor checkout apparatus and method to ensure the governor's proper function in the event of an electronic controller failure.

U.S. Pat. Nos. 3,370,600; 3,831,615; 3,945,199; 3,955,424; 4,123,942; and 4,164,235 disclose governor assemblies or the like.

DISCLOSURE OF INVENTION

An object of the present invention is to provide a governor checkout apparatus and method for checking out the operation of a governor during start-up operations of a prime mover which rotatably drives a device whose rotative speed is maintained by the governor. More particularly, an object of the invention is to provide a governor checkout apparatus which permits checking out the governor without running up the engine to normal operating speed so that a faulty governor can be detected and repaired or replaced while avoiding damage to the engine as a result of an overspeed condition.

These and other objects of the invention are attained by the governor checkout apparatus of the invention which comprises means for adjusting a governor for operating in either a first, checkout mode where the governor is actuated to maintain a substantially lower rotative speed as compared with during normal operation, or a second, operating mode where the governor is actuated to maintain a substantially higher rotative speed for normal operation of the device, and means for automatically operating the adjusting means so that the governor is in the first, checkout mode during a start-up operation, whereby the operation of the governor can be checked out during start-up operation. In the disclosed embodiment the governor checkout apparatus is hydraulically operated. An engine operated fluid supply stops supplying pressurized fluid to the governor checkout apparatus when the engine is shut off. In the absence of pressurized fluid to the apparatus, the adjusting means of the governor is automatically operated under the force of a spring to place the governor in the first, checkout mode against the force of the spring. During start-up operation of the engine, pressurized fluid is supplied to the governor checkout apparatus to adjust the governor to the second, operating mode. However, the fluid supply to the checkout apparatus is intentionally retarded or limited at the beginning of the start-up operation to allow time to check the operation of the governor while it is still in the first, checkout mode. After a short period of time, the supply of hydraulic fluid is increased to operate the adjusting means to adjust the governor to the second, operating mode.

The governor of the invention for maintaining the rotative speed of a device rotated by a prime mover is thus seen to be characterized by a governor checkout apparatus for checking out the operation of the governor during start-up operation of the prime mover, wherein the checkout apparatus includes means for sensitizing the governor so that it is actuated to maintain a substantially lower rotative speed during the start-up operation of the prime mover as compared with during normal operation.

In the disclosed, preferred embodiment of the invention, the governor is an overspeed governor for adjusting the blade pitch of a propulsor of an aircraft engine to prevent propulsor overspeed. The overspeed governor comprises a flyweight governor which is rotated in response to rotation of the propulsor, a governor pilot valve with a valve spool which is axially moved in response to actuation of the flyweight governor for adjusting the blade pitch of the propulsor, and means for checking out the operation of the governor during the start-up operation of the aircraft engine. The means for checking out comprises means for sensitizing the flyweight governor so that it is actuated to maintain a substantially lower propulsor rotative speed during the start-up operation as compared with during normal operation, whereby the operation of the governor can be checked out during start-up operation of the aircraft engine.

The governor comprises a compression spring which resists actuation of the governor and axial movement of the valve spool. The compression force of the spring determines the rotative speed when the flyweight governor is actuated to axially move the spool. The means for sensitizing includes means for providing a reduced compression force of the spring during start-up operation.

The means for providing a reduced compression force comprises a hydraulic piston-cylinder drivingly connected to compress the spring, means for supplying pressurized fluid to the piston-cylinder during engine operation to actuate the piston-cylinder for compressing the spring with a force which maintains propulsor rotation speed for normal operation and means for delaying supply of the pressurized fluid to the piston-cylinder during start-up operation so that a lower compression spring force exists for maintaining the substantially lower propulsor rotative speed to permit checking out the operation of the governor.

According to a further feature of the invention, the means for delaying comprises a timing orifice located in a first supply line for supplying pressurized fluid to the piston-cylinder at a relatively slow rate to allow time for checking out the operation of the governor. A second supply line is also provided for supplying pressurized fluid to the piston-cylinder after the piston has been moved a predetermined distance by pressurized fluid supplied to the piston-cylinder through the first supply line for rapidly compressing the spring to increase the governor setting to normal speed.

In the disclosed embodiment, the piston of the piston-cylinder is drivingly connected for compressing the spring of the governor by way of a push rod located between the piston and the compression spring. A bearing is also provided between the push rod and the compression spring to permit relative rotation therebetween.

From the above description of the governor checkout apparatus of the invention, it can be seen that the method of the invention for checking out the operation of a governor for maintaining the rotative speed of a device rotatably driven by a prime mover comprises the steps of sensitizing the governor so that it will be actuated for maintaining rotative speed at a substantially lower speed during a start-up operation of the prime mover as compared with during normal operation of the prime mover, and checking to determine if the governor is operating during the start-up operation. The step of checking to determine if the governor is operating during the start-up operation can be simply performed by the operator by visually monitoring the speed of the engine during start-up to see that it is maintained at the substantially lower operating speed. Alternatively, an electronic controller can be used to monitor the blade pitch position and speed during the start-up operation to see if the governor is performing its function of maintaining the rotative speed at a substantially lower speed during the start-up operation.

The method of the invention further comprises the step of de-sensitizing the governor after the checking step to permit the governor to maintain normal operating speed of the device after the checking step. The step of sensitizing the governor comprises reducing the force applied to a compression spring of the governor for adjusting the governor setting when the prime mover is inoperative and delaying restoration of the normal operative force applied to the compression spring during the prime mover start-up operation to permit the checking step to be performed.

These and other objects, features and advantages of the present invention will become more apparent from the following description when taken in connection with the accompanying drawings, which show, for purposes of illustration only, one preferred embodiment in accordance with the present invention.

BEST MODE FOR CARRYING OUT THE INVENTION

Figure 1:
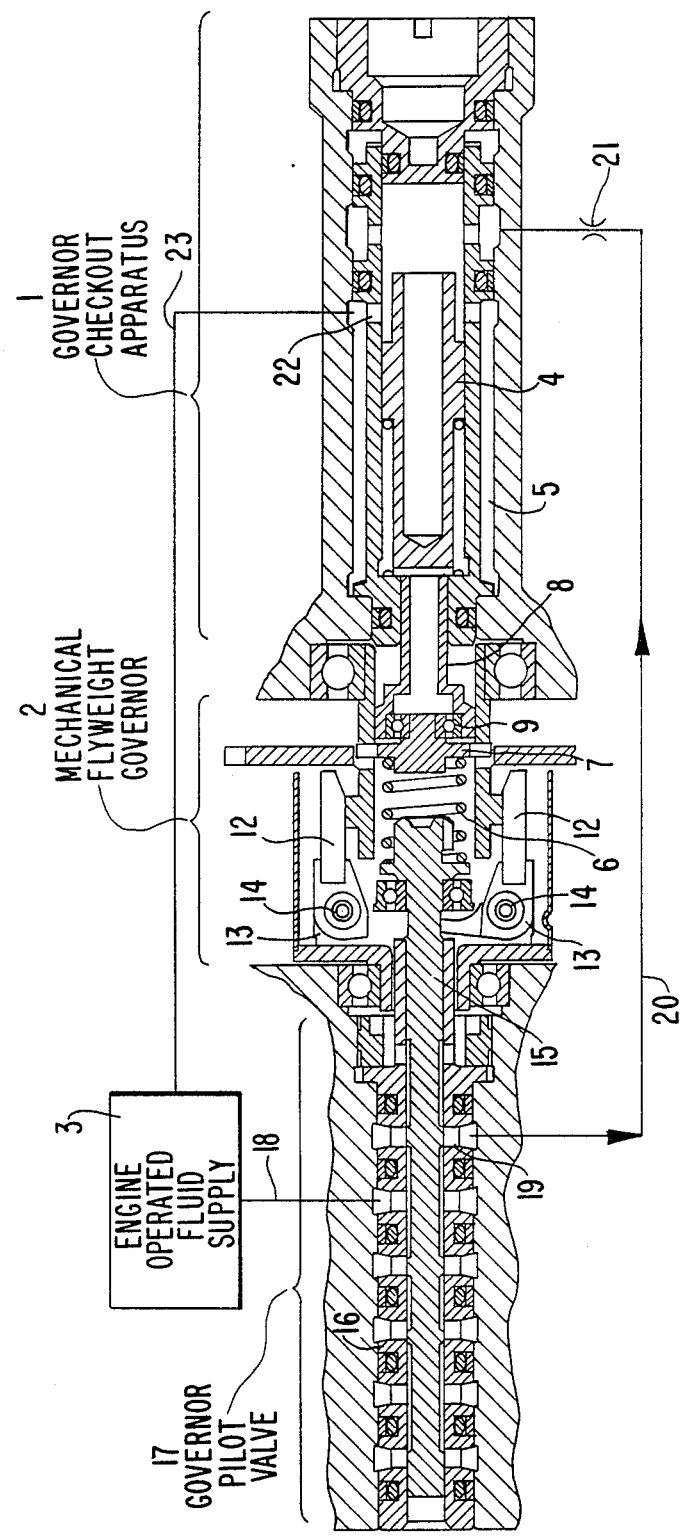
FIG. 1 is a cross-sectional view through a governor checkout apparatus of the invention along with its associated mechanical flyweight governor and governor pilot valve for adjusting the blade pitch of a propulsor of an aircraft engine.

Referring now to the drawings, a governor checkout apparatus 1 according to the invention is illustrated in FIG. 1. The apparatus is a hydraulically operated mechanism which adjusts a mechanical flyweight governor 2 between a first, checkout mode where the governor 2 maintains a substantially lower propulsor rotative speed than that during normal operation, and a second, operating mode where the governor 2 is actuated to maintain a substantially higher propulsor rotative speed for normal operation.

An aircraft engine operated fluid supply 3 supplies pressurized fluid to the governor checkout apparatus 1 during operation of the aircraft engine. Before the engine is started up, a control piston 4 of the apparatus 1 is moved to the extreme right in its cylinder 5 because of lack of supply pressure and in response to a force pushing the control piston 4 to the right derived from a compression spring 6 of the mechanical flyweight governor 2. The force from the compression spring 6 acts on the left end of the control piston 4 by way of spring cooperating member 7 and a push rod 8 of the governor checkout apparatus 1. A bearing 9 is located between the push rod 8 and the spring cooperating member 7 so that the rotary movement of the governor 2 is not transmitted to the governor checkout apparatus 1, which does not rotate. As the assembly of the spring cooperating member 7, push rod 8, bearing 9 and control piston 4 is moved to the right under the application of force from the compression spring 6, the force of the spring resisting the actuation of the mechanical flyweight governor 2 is lowered.

The flyweight governor 2 is rotated with a propulsor 10 of an unducted fan propulsor engine 11 for an aircraft through a driving connection explained below with reference to FIG. 2. Flyweights 12 of the governor 2 tend to move radially outward with increasing velocity of rotation, causing the associated arms 13 of the governor to pivot about their pivots 14 and, in turn, axially move a spool 15 of hydraulic spool valve 16 to the right as shown in FIG. 1, against the bias of the spring 6. The spool 15 and spool valve 16 form a governor pilot valve 17. The axial movement of the spool 15 within the valve 16 controls the flow of hydraulic fluid for adjusting the pitch of the propulsor 10 as discussed below with reference to FIG. 2, to make the necessary blade pitch corrections in response to the sensed speed. The spool 15 of the governor pilot valve 17 rotates with the flyweights 12 of the governor 2 through the spring 6 to minimize the spool drag and improve accuracy.

Considering further the operation of the governor checkout apparatus 1, when the engine 11 is started up and is accelerating to idle speed, supply pressure is available to the pilot valve 17 from the engine operated fluid supply 3 by way of fluid line 18. At slightly below idle, the spool 15 translates to the right, under the application of the pressurized fluid, enough to port supply pressure through the port 19 to the right end or back of the control piston 4 through a supply line 20 having an orifice 21 therein for slowing the supply of pressurized fluid to the cylinder 5 of the apparatus 1.

When the propulsor 10 accelerates a small amount more, the governor 2 will change the pitch of the blades thereof by means of the governor pilot valve 17 to maintain the propulsor speed at a speed substantially lower than the normal operating speed because of the reduced force of compression spring 6. While this is occurring, the operator can note the substantially lower operating speed of the propulsor 10 which is being maintained by operation of the governor 2 and governor pilot valve 17. Alternatively, a conventional electronic controller can be used to make such a determination by monitoring the blade pitch position and hub speed to see if the governor 2 is functioning properly.

After a sufficient period of time, which is determined by the size of the orifice 21 and the area of the control piston 4 and which permits the operator or controller the time necessary to check the functionality of the governor 2, the control piston 4 passes supply port 22 in its cylinder and pressurized fluid is ported without substantial restriction directly behind the right end of the control piston 4 by way of supply line 23. This causes the compression spring 6 to be rapidly compressed, increasing the governor setting to normal speed. Pressurized fluid is supplied at the supply port 22 to maintain this normal setting until the engine is shut down.

Figure 2:
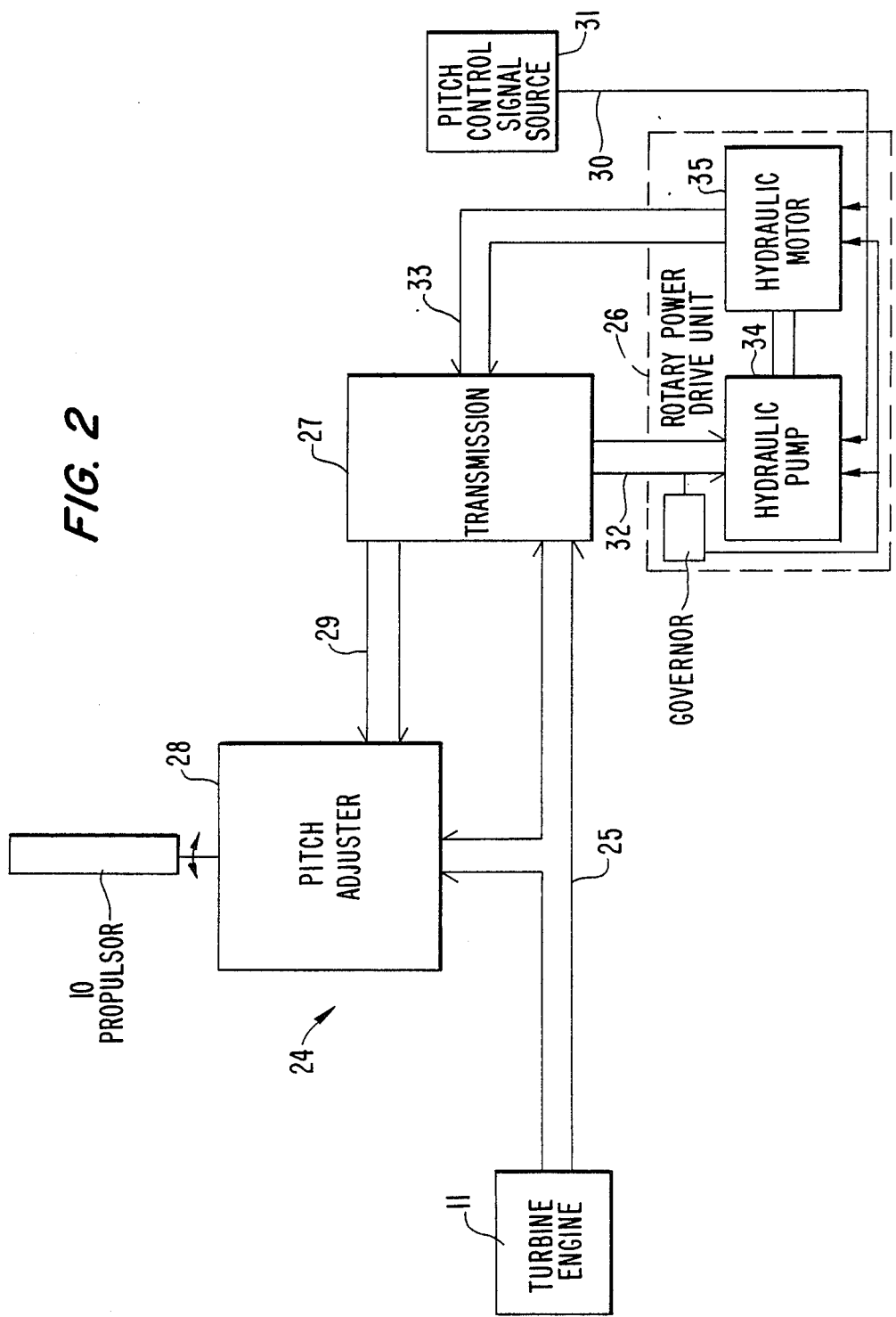
FIG. 2 is a block diagram illustrating the governor in use in a control mechanism for propulsor pitch control.

A control mechanism for propulsor pitch control with which the governor with governor checkout apparatus of the invention may be used is illustrated schematically in FIG. 2. A turbine engine 11 illustrated therein is an aircraft propulsion turbine having a pair of counter-rotating, external, unshrouded fans or propulsors. Pitch adjustment in such a turbine is necessary for the safe and efficient operation of the aircraft through the flight envelope. Known designs of unshrouded fan turbines of this type change the pitch of the propulsor blades by means of a hydraulic pump-power drive unit combination. More specifically, a hydraulic pump is driven by power taken by direct mechanical connection to the turbine main shaft to product pressurized hydraulic fluid which is applied to a remotely located power drive unit by means of hydraulic lines. The pitch adjusting mechanism has an outer shaft which is driven by a free turbine powered by pressurized gas after passage through the turbine section powering the main shaft. The free turbine directly supplies the rotary power for the unshrouded fans and, therefore, the rotational velocity of the free turbine is directly proportional to the rotational velocity of the blades. The pitch adjusting mechanism also has an inner control shaft concentric with the outer shaft which operates at a rotational velocity proportional to a change in pitch specified by a pitch control signal source which produces a signal under pilot or automatic control. A transmission provides the reference and control shafts to the pitch adjusting mechanism. The transmission receives power directly from the rotating blades of the unshrouded fans and also receives an input from the power drive unit which has a rotary velocity proportional to the change in pitch control signal.

The pitch controller 24 illustrated in FIG. 2 is for controlling the pitch of the blades of fan or propulsor 10 which are driven by turbine propulsion engine 11. The power applied to the shaft 25 is derived from rotation of an unshrouded fan blade assembly which is driven by a free turbine. The pitch controller 24 has a hydraulic pump-motor combination 26 constituting a rotary power drive unit which is driven directly by shaft power from the turbine propulsion engine 11 by drive shaft 25 applied to a transmission 27.

The pitch controller 24 is powered by a small fraction of the propulsion power available to the fan section provided by the turbine propulsion engine 11. The free turbine section (not shown) of the turbine propulsion engine 11 is directly coupled to input drive shaft 25. The input drive shaft 25 is connected to a first input of transmission 27 and to a first input of a pitch adjuster 28 of known construction which adjusts pitch in response to a difference in the rotational velocity of the input drive shaft 25 and a second input of the pitch adjuster 28 provided by drive shaft 29 which is a first output from transmission 27. The details of such a transmission are disclosed in the commonly assigned, copending U.S. patent application Ser. No. 215,356, filed July 5, 1988, the disclosure of said application being incorporated herein by reference.

The ratio of the rotational velocity of the input drive shaft 25 to the rotational velocity of the input drive shaft 29 is maintained constant by the transmission 27 when a pitch control signal 30 from pitch control signal source 31 is commanding that the pitch of the blades of propulsor 10 is not to change. The ratio of the rotational velocity of the input drive shaft 25 to the rotational velocity of the input drive shaft 29 is caused to vary by the transmission 27 in direct proportion to the magnitude of the change in pitch commanded by the pitch control command source 31. In other words, the velocity of the shaft 29 is proportional to the first derivative of the pitch control command. Although not illustrated, it is understood that positional feedback is provided from the blades of the propulsor 10 to the source 31 so that the pitch control signal becomes constant when the propulsor blades assume their new commanded position. The generation of the pitch command signal 30 is a complex interaction of the pilot of the aircraft and various sensed parameters of aircraft operation such as altitude and velocity as is known regarding unshrouded, external fan propulsion engines. The method of generation of the pitch control signal 30 is conventional and not per se part of the present invention. The source 31 is an electronic controller capable of looking at blade position and speed by way of the aforementioned feedback so that it can make a determination during start-up operation as to whether the governor is properly functioning. As noted above, in the event of failure of the electronic controller, the hydraulically operated overspeed governor is required to mechanically control the pitch of the blades of the propulsor 10 to prevent overspeed thereof.

The rotary power drive unit 26 is connected to transmission 27 to receive drive power from the second output 32 of the transmission 27 and to provide an input to the transmission 27 by shaft 33 which controls the rotational velocity of the first output 29 of the transmission. The rotary power drive unit 26 includes hydraulic pump 34 which is directly connected to hydraulic motor 35 without any external hydraulic lines. The combination of the hydraulic pump 34 and hydraulic motor 35 are a torque amplifier which produces a second input on the input shaft 33 to the transmission 27 having a variable speed which is proportional to the change in pitch commanded by the pitch control signal 30. As illustrated in FIG. 2, the pitch control signal 30 is connected to the hydraulic pump 34 and the hydraulic motor 35. However, in practice, the pitch control signal may be applied to the hydraulic pump to vary the pressure of the hydraulic fluid provided to the hydraulic motor to control the rotational speed of the shaft 33 or to the hydraulic motor to directly control the rotational velocity of the shaft 33. The control of the hydraulic pump 34 and hydraulic motor 35 in the aforementioned manner is conventional.

The pitch controller 24 operates as follows. Input drive power is provided by direct mechanical coupling on input drive shaft 25 from the free turbine section of the turbine propulsion engine 11. Input drive shaft 25 has a rotational speed proportional to the rotational velocity of the blades of the propulsor 10. Rotary power from the input drive shaft 25 is also provided to the pitch adjuster 28. Rotary power from the input drive shaft 25 is also provided by drive shaft 32 to the hydraulic pump 34 of rotary power drive unit 26 through transmission 27. A change in the rotational velocity of the drive shaft 29 is directly proportional to a change in the rotational velocity of the input shaft 33 which, in turn, is directly proportional to change in pitch commanded by the pitch control signal.

Under normal operation, when the pitch of the propulsor or fan blades is to remain constant, the rotary power input shaft 29 rotates with a fixed ratio of the velocities of the shafts 25 and 29 and, preferably, at the same rotational speed of the input drive shaft 25. Upon receipt of a change in the pitch control signal 30, the rotary power drive unit 26 varies the velocity of shaft 33 in direct proportion to the commanded change in pitch. The change in rotational velocity imparted to the input shaft 29 by the transmission 27 causes the rotary power input shaft 29 to rotate at a rotational speed different from the rotational speed of the input drive shaft 25. The difference in rotational velocity between the rotary power input shaft 29 and the input drive shaft 25 causes the pitch adjuster 28 to adjust the pitch of the plurality of blades of the propulsor 10 of the turbine propulsion engine in proportion to the change in pitch commanded by the pitch control signal 30.

As noted above, in the event of failure of the electronic controller 31, the governor 2 mechanically controls the pitch of the blades of propulsor 10, based on the speed of the propulsor as detected from movement of shaft 32 to prevent overspeed of the propulsor blades. Normally, the electronic controller 31 controls the speed of the propulsor so that the governor is not actuated for controlling the speed of the propulsor, except during start-up operation when the governor checkout apparatus 1 causes the governor 2 to be actuated to maintain a substantially lower propulsor rotative speed during the start-up operation as compared with during normal operation. When the governor 2 is so actuated during start-up, the hydraulic pump 34 and/or hydraulic motor 35 are controlled by the governor pilot valve 17 for adjusting the speed of the output shaft 33 and thereby the pitch of the blades of the propulsor.

While this is occurring, the electronic controller 31 detects the blade position and hub speed of the propulsor to determine if the governor 2 is functioning properly. After a sufficient period of time for the controller to check functionality, a period of several seconds, for example, the control piston passes the supply port 22 and the compression spring 6 is then rapidly compressed to maintain the normal setting of the governor until the engine 11 is shut down.

While we have shown and described only one embodiment in accordance with the present invention, it is understood that the same is not limited thereto, but is susceptible of numerous changes and modifications as known to those skilled in the art. Therefore, we do not wish to be limited to the details shown and described herein, but intend to cover all such changes and modifications as are encompassed by the scope of the appended claims.

We claim:

1. An overspeed governor for adjusting the blade pitch of a propulsor of an aircraft engine to prevent propulsor overspeed comprising a flyweight governor which is rotated in response to rotation of said propulsor, a governor pilot valve with a valve spool which is axially moved in response to actuation of said flyweight governor for adjusting the blade pitch of the propulsor, and means for checking out the operation of the governor during a start-up operation of the aircraft engine, said means for checking out comprising means for sensitizing the flyweight governor so that it is actuated to maintain a substantially lower propulsor rotative speed during the start-up operation as compared with during normal operation, whereby the operation of the governor can be checked out during start-up operation of the aircraft engine.

2. The overspeed governor according to claim 1, wherein said governor comprises a compression spring which resists actuation of the governor, the compression force of said spring determining the rotative speed at which the flyweight governor is actuated to axially move the spool valve, said means for sensitizing including means for providing a reduced compression force of said spring during start-up operation.

3. The overspeed governor according to claim 2, wherein said means for providing a reduced compression force comprises a hydraulic piston-cylinder drivingly connected to said compression spring, means for supplying pressurized fluid to said piston-cylinder during engine operation to actuate said piston-cylinder for compressing said spring with a force which maintains propulsor rotation speed for normal operation and means for delaying application of the full pressure of said pressurized fluid to said piston-cylinder during start-up operation so that a lower compression spring force exists for maintaining said substantially lower propulsor rotative speed to permit checking-out of the operation of said governor.

4. The overspeed governor according to claim 3, wherein said means for delaying comprises a timing orifice located in a first supply line for supplying pressurized fluid to said piston-cylinder at a relatively slow rate to allow time for checking out the operation of said governor after engine start up.

5. The overspeed governor according to claim 4, further comprising a second supply line for supplying pressurized fluid to said piston-cylinder after said piston has been moved a predetermined distance by pressurized fluid supplied to said piston-cylinder through said first supply line, for rapidly compressing the spring to increase the governor setting to normal speed.

6. The overspeed governor according to claim 3, wherein the piston of said piston-cylinder is drivingly connected to said spring by way of a push rod located between said piston and said compression spring.

7. The overspeed governor according to claim 6, wherein bearing means are provided between said push rod and said compression spring to permit relative rotation therebetween.

8. In a governor for maintaining the rotative speed of a device rotated by a prime mover, the improvement comprising a governor checkout apparatus for checking out the operation of the governor during start-up operation of said prime mover, said checkout apparatus including means for sensitizing the governor so that it is actuated to maintain a substantially lower rotative speed during the start-up operation of said prime mover as compared with during normal operation.

9. A method of checking out the operation of a governor for maintaining the rotative speed of a device rotatably driven by a prime mover, comprising the steps of sensitizing the governor so that it will be actuated for maintaining rotative speed at a substantially lower speed during a start-up operation of said prime mover as compared with during normal operation of said prime mover, and checking to determine if the governor is operating during said start-up operation.

10. The method according to claim 9, further comprising the step of de-sensitizing the governor after said checking step to permit the governor to maintain a normal operation speed of said device after said checking step.

11. The method according to claim 9, wherein said step of sensitizing the governor comprises reducing the force applied to a compression spring of the governor for adjusting the governor setting when said prime mover is inoperative and delaying restoration of the normal operating force applied to said compression spring during the prime mover start-up operation to permit said checking step.

12. A governor checkout apparatus for checking out the operation of a governor during start-up operation of a prime mover which rotatably drives a device whose rotative speed is maintained by said governor, comprising means for adjusting a governor so that it is operable in either a first, checkout mode where the governor is actuated to maintain a substantially lower device rotative speed as compared with during normal operation, and a second, operating mode where the governor is actuated to maintain a substantially higher device rotative speed for normal operation of said device, and means for automatically operating said adjusting means for operating said governor in said first, checkout mode during a start-up operation of said prime mover so that the operation of the governor can be checked out during start-up operation.

* * * * *